(12) United States Patent
Pearson et al.

(10) Patent No.: US 8,768,978 B2
(45) Date of Patent: Jul. 1, 2014

(54) SINGLE-OPERATION ON-LINE SCHEMA EVOLUTION

(75) Inventors: Carol Jean Pearson, Portland, OR (US);
David W. Birdsall, Santa Clara, CA (US); Roberta S. Marton, Fremont, CA (US); Emile Roth, Campbell, CA (US); John M. Hausman, San Luis Obispo, CA (US); Kenneth K. Luu, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1874 days.

(21) Appl. No.: 11/830,541

(22) Filed: Jul. 30, 2007

(65) Prior Publication Data
US 2009/0037462 A1 Feb. 5, 2009

(51) Int. Cl.
*G06F 17/30* (2006.01)
(52) U.S. Cl.
USPC .......................................... 707/809; 707/704
(58) Field of Classification Search
USPC .................................. 707/100, 101, 704, 809
See application file for complete search history.

(56) References Cited

U.S. PATENT DOCUMENTS

| 5,396,623 | A | * | 3/1995 | McCall et al. ........................ 1/1 |
| 5,619,685 | A | * | 4/1997 | Schiavone ...................... 703/20 |
| 6,122,640 | A | * | 9/2000 | Pereira ...................... 707/103 R |
| 6,343,296 | B1 | * | 1/2002 | Lakhamraju et al. .. 707/999.103 |
| 7,689,581 | B2 | * | 3/2010 | Fagin et al. ............ 707/999.102 |
| 2003/0135478 | A1 | * | 7/2003 | Marshall et al. .................. 707/1 |
| 2004/0172392 | A1 | * | 9/2004 | Nomoto et al. .................. 707/4 |
| 2005/0216281 | A1 | * | 9/2005 | Prior ................................. 705/1 |
| 2006/0294120 | A1 | * | 12/2006 | Li et al. ......................... 707/100 |

* cited by examiner

*Primary Examiner* — Rehana Perveen
*Assistant Examiner* — Scott A Waldron

(57) ABSTRACT

A method for modifying an original data object in a database using a single command is disclosed. The single command is first validated. Once the command has been validated a ghost data object is created using the new definition. The ghost data object is populated with data from the original object. The transaction log records from the original data object are applied to the ghost data object. The original data object is then locked for exclusive access. The final transaction log records from the original data object are applied to the ghost data object. In the final step the database switches to the new data object. Dependent objects are automatically transformed as part of the same operation.

25 Claims, 3 Drawing Sheets

SINGLE-OPERATION ON-LINE SCHEMA EVOLUTION

BACKGROUND

Data in a data warehouse is not stagnant. Database administrators (DBAs) start out with terabytes of data from many sources. New data comes in every day. The new data may be of differing data types and may come from the same source or from new sources. Over time, new associations in the data become clear while old associations become obsolete. Existing data needs to be recast into larger containers or different type containers or with a different ordering. The recasting reflects the data's current usage, which changes over time. The database schema needs to change over time to meet users' needs for high-performance, on-demand data; the term for this is schema evolution.

Schema Evolution may require transforming every data row, changing column ordering, data types, container sizes, clustering keys, physical partitioning, and/or row formatting, all while maintaining data consistency, integrity and availability. Metadata (information about the data including how it is defined, organized, and stored, as well as information about relationships with other objects in the database) also must be changed, as must information replicated to improve performance such as indexes and materialized views. This schema evolution needs to be done while the data warehouse is also being queried and updated.

Current database application programs offer some functionality that allows the database structures to change over time. The current functionality is restrictive on the types of changes allowed, may require multiple operations or commands, and may need to take the data off-line to implement the changes to the database structures. There may be untransformed data after the schema evolution operation completes which has query performance impact.

DETAILED DESCRIPTION

Figure 1:
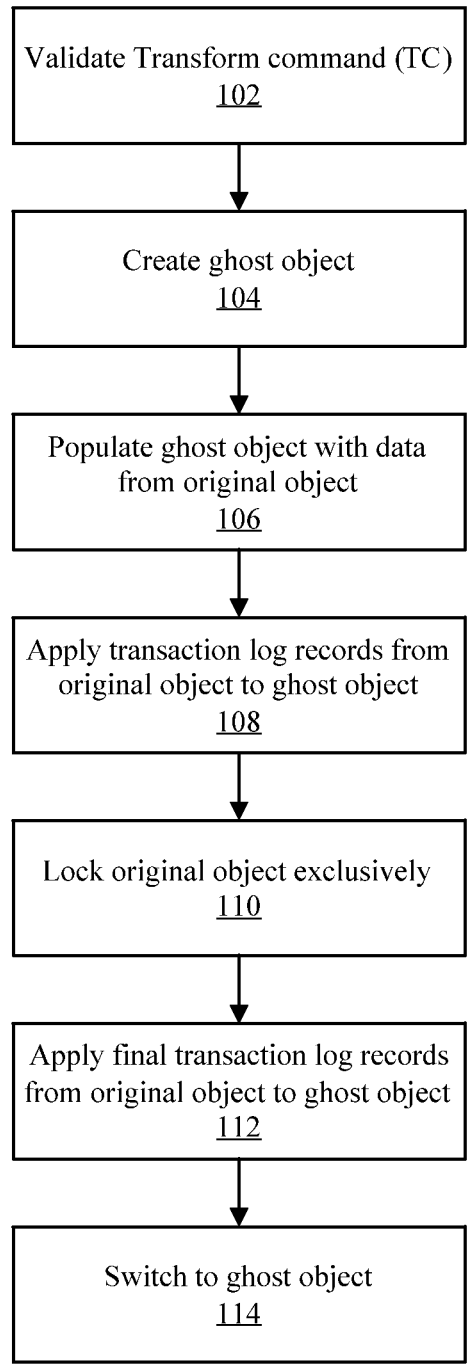
FIG. 1 is a flow chart of a method for implementing a TRANSFORM command in an example embodiment of the invention.
Figure 2:
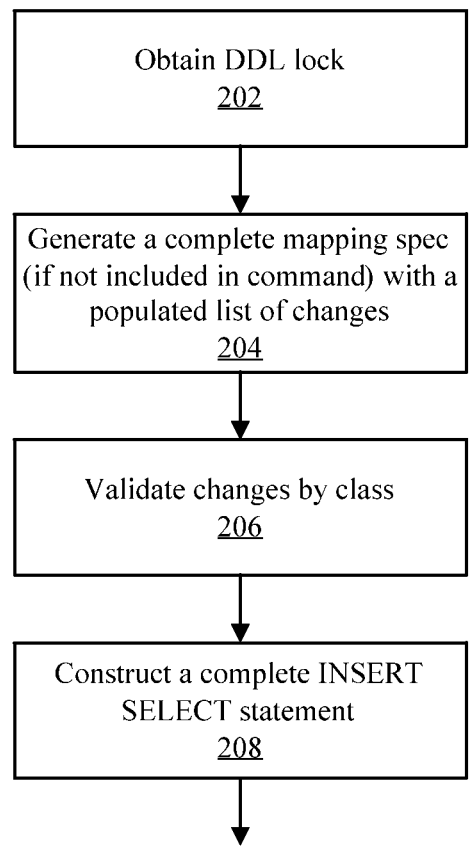
FIG. 2 is a flow chart showing the validation step 102 in more detail in an example embodiment of the invention.
Figure 3:
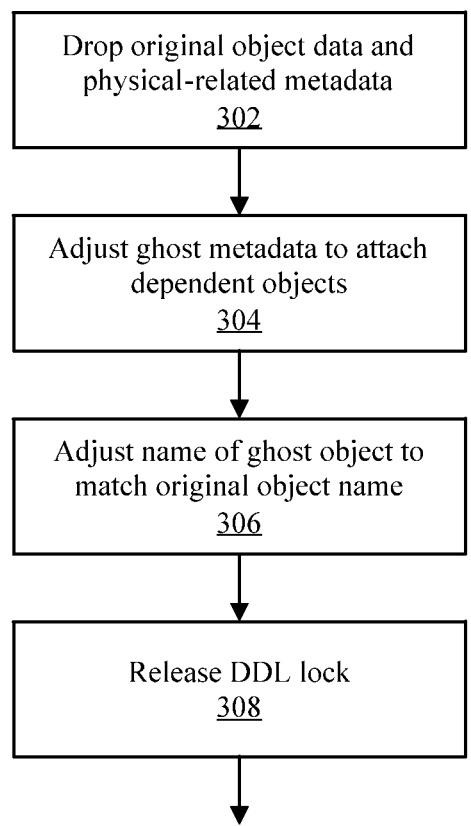
FIG. 3 is a flow chart showing the switch step 114 in more detail in an example embodiment of the invention.

FIG. 1-FIG. 3 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

A method for schema evolution is disclosed. Schema evolution enables users to change the shape of data while keeping the metadata and other associations consistent and keeping data available for update during the operation. Schema Evolution may require transforming every data row, changing column ordering, data types, container sizes, clustering keys, physical partitioning, and/or row formatting, all while maintaining data consistency, integrity and availability. Metadata also must be changed, as must information replicated to improve performance such as indexes and materialized views. In one example embodiment of the invention, schema evolution is implemented with a TRANSFORM command.

The TRANSFORM command may be implemented using multiple user interfaces or syntaxes. In a first embodiment of the invention, the syntax of the TRANSFORM command completely describes the new object. A TRANSFORM command using this syntax will be called the full object syntax. In a second example embodiment of the invention, the syntax of the TRANSFORM command defines the differences between the original object and the new object. A TRANSFORM command using this syntax will be called the differential object syntax. The two different syntaxes of the TRANSFORM command adds flexibility and safety for the users.

When a user wishes to make major changes to an original object, the full object syntax gives the user complete control over the final definition of the new object. Some data objects are large and may have complex shapes. A typographical error in the data definition of the new object can corrupt the transformed data object when using the full object syntax. When a user only wishes to make a small change in the shape of a data object, the user can specify the differences or changes between the original object and the new object using the differential object syntax. The difference between the original object and the new object can be defined without having to specify the shape of the entire new object. For example, a user may wish to change the cluster key of a large object. The user can change the cluster key of the object using the differential object syntax, without having to specify the full shape of the new data object.

Database administrators (DBAs) may redefine partitioning schemes and change the number of partitions, change column data types and ordering, add and delete columns, change data grouping by redefining the clustering key column(s), and accomplish certain data-heavy administrative changes (changing internal record storage formats, changing hash partitioning schemes). The TRANSFORM command or utility reshapes the object to the new definition, including automatic redefining of any related objects and metadata that are affected by the transformation. Applications can access the rows in the object for both read and update while the data is reshaped.

Using the full object syntax, TRANSFORM allows users to specify the new object definition completely using standard Database CREATE object statements. The TRANSFORM command allows for the use of all available CREATE object attributes in the CREATE object statement. In one example embodiment of the invention, the object can be completely redefined in a single operation. For complex shape-changes like rearranging column order and changing columns to incompatible types, the TRANSFORM command may require users to explicitly define the transformation mapping using standard database INSERT . . . SELECT statements. Users can update the data while it is being transformed and the Database automatically keeps the data and metadata consistent across all objects affected by the operation.

In one example embodiment of the invention the full object syntax of the TRANSFORM command may have the following form:

---

TRANSFORM TABLE [cat.][schema.] table-name
   TO 'CREATE TABLE [cat.][schema.] table-name
     { (table-element [, table-element] ... ) | like-spec}
     [file-option ...]'
     [ USING 'mapping-spec' ]
     [ transform-dependent-objects-spec ]
     [access-option]
     ;

---

Where TRANSFORM TABLE is the command name, cat is the catalog name, schema is the unit of ownership (All database objects in a schema are owned by the schema owner) and table-name is the name of the original table being transformed. TO separates the original table information from the definition of the modified table. CREATE TABLE is the standard command for creating a table in the database and includes the list of table-elements, may include a like-spec, and one or more file-option's. USING is a flag for including a mapping specification. mapping-spec is the specification for mapping the original table into the new table definition. transform-dependent-objects-spec is the specification used to transform any dependent objects of the original table. access-option is a flag that indicates data availability during the operation. Applications can always read data from the table during the transformation. By default, applications can also update data in the table during the operation. Optionally, applications can be restricted to read-only operations to improve performance in some cases.

In one example embodiment of the invention, the differential object syntax of the TRANSFORM command may have the following form:

```
TRANSFORM TABLE [cat.][schema.]table TO
( transform-spec [,transform-spec] ... )
    [ USING 'mapping-spec' ]
    [ transform-dependent-objects-spec ]
    [access-options] ;
where transform-spec is one or more of:
    [new-hash-partition-spec] |
    [column-name TO column-definition ] |
    [clustering-key-spec] |
    [file-option-spec]
```

FIG. 1 is a flow chart of a method for implementing a TRANSFORM command in an example embodiment of the invention. At step 102 the transform command is validated to ensure that it is semantically acceptable. At step 104 a ghost object with the new definition is created. A ghost object is a hidden object only visible and accessible to TRANSFORM. At step 106 the ghost object is populated with data from the original object. At step 108 the transaction log records from the original object are applied to the ghost object. At step 110 the original object is exclusively locked. At step 112 the final log records from the original object are applied to the ghost object. At step 114 the switch is made and the ghost object becomes the new object, replacing the original object. When access-options specify read-only during the TRANSFORM, the original object is locked to prevent write access at the start of step 104 and steps 108 and 112 are skipped.

In step 102 the TRANSFORM command is validated to ensure that it is semantically acceptable before initiating the actual transformation of the old object. Validation comprises existence and privilege checks for all objects named in the command and simple validation of command parameters. The first step in validation is to obtain a data definition language (DDL) lock, that is to block DDL updates for the original or primary object and for its dependent objects. This ensures that the definition that TRANSFORM is about to validate does not change before the actual transformation begins.

The next step in the TRANSFORM initialization and validation is to do an initial check to ensure that the original definition can be transformed to the new definition for the object. If mapping-spec is provided as an argument to the TRANSFORM command, it is validated and used as the basis for the transformation process. The user provided mapping-spec is validated by creating a non-materialized view using the selection expression portion of mapping-spec as the view selection and casting criteria. If view creation fails, then mapping-spec is invalid and the TRANSFORM operation stops. If view creation succeeds, then the INSERT . . . SELECT is sufficiently valid that the TRANSFORM operation continues, though certain types of errors might still occur using mapping-spec, many of which can be handled through the exception facility. If there is no mapping-spec provided or it does not include all columns, a complete mapping-spec gets generated. The mapping-spec might be as simple as "INSERT INTO table SELECT * FROM table" or as complicated as casting each column into a different data type.

The initial check compares the TRANSFORM populated list of changes to the object's original definition to determine what changed. The changes are validated by class. Below are the classes and the changes that can be made to each class:

Partition changes: There can be a different number of new partitions, more or fewer. Users can change the partitioning key column list at the same time as they change the partition counts.

Column definition: Column data types might be expanded to larger container sizes, shrunk to smaller sizes, or changed to entirely different, incompatible types. There might be more columns or fewer, and for each column, its attributes might be the same or different. The logical column order might change from the original to the new definition, and one or more columns might have null indicators added or removed. If the data types and/or column orders are different, then the mapping is checked if provided in mapping-spec or constructed if needed. If there is no reasonable mapping that can be generated, an error is returned. It is possible that the transformation specified might cause later transformation errors. If the user has provided a mapping-spec to cover the transformation and it takes as input a column value in the original data format and emits as output a column-value in the new format, then it is presumed to be valid. As the new object gets populated, a transformation error might occur if the transformation results in an invalid value for the new definition (say, because significant, nonpadded column data would be truncated or because a uniqueness constraint might be violated). Those sorts of errors cannot be detected at validation time. TRANSFORM includes an exception facility to remove these records while maintaining data consistency.

Key changes: New columns can be added or deleted to the clustering key, the column list can be reordered, and/or individual columns' sort order could be changed from ascending to descending or vice versa. All new key columns' data types are checked against the rules for keys (for example, the clustering key columns can't be null).

There is some dependency between column definitions and changes in the partitioning and clustering keys. In particular, users can add and drop columns; some of these columns might be clustering key columns. Validating dropped columns isn't isolated to the column-definition item if the column is contained in the clustering key; it might be that the key is changed in the clustering-key-spec to no longer include the column being dropped. Similarly, columns added to the clustering key might need to have their data types changed to be NOT NULL. A column that is being removed from the clustering key can be made nullable.

When applying a valid mapping-spec, some few records in the table might not be compatible with the new definition for the table. For example, mapping-spec might adjust values in a column that are declared to be UNIQUE, rendering some of them non-unique or violating some other constraint. As another example, some records might contain data values whose conversion to a new type or truncation might result in loss of significant information. TRANSFORM includes an exception facility to remove these records while maintaining subsystem consistency.

The exception facility in TRANSFORM inserts the non-compatable records into an exception table, rather than into the transformed table. Then the TRANSFORM continues converting subsequent rows. After the TRANSFORM command completes and all unconvertible records are identified, a user can manually resolve these exception rows, adjusting the data to be compatible with the new definition or rejecting the insert. Users can limit the number of records inserted into the exception table to a specified limit to prevent runaway TRANSFORM operations due to a valid but incorrect mapping-spec.

TRANSFORM also supports a VERIFYONLY option to identify rows that are unconvertible given a particular mapping specification. In this case, unconvertible rows are inserted into the exception table and valid rows are ignored. This facility allows users to try out a TRANSFORM mapping-spec before actually executing the operation.

As the transformation is understood, the complete INSERT . . . SELECT statement for the mapping is constructed. This statement contains the mapping for each column from the old to the new. Optimized IO can be used if the data order doesn't change or if it can be presorted. The access level in the statement is determined by the access-option parameter in the TRANSFORM statement; for the default access-option mode, READ UNCOMMITTED is used.

FIG. 2 is a flow chart showing the validation step 102 in more detail in an example embodiment of the invention. At step 202 a DDL lock is obtained for the original object. When a mapping specification is not included as an argument to the TRANSFORM command, a complete mapping specification is generated at step 204. The mapping specification includes a populated list of changes made between the original object and the new object. At step 206 the populated list of changes is validated by class. At step 208 a complete INSERT . . . SELECT statement is generated.

Once the TRANSFORM command has been validated, the TRANSFORM command creates a ghost object, hidden from application access, using the new object's definition. This new object is created directly from the user-specified CREATE object statement, and any parameters not specified are defaulted as they would be in any CREATE object statement. If a parameter is not specified in the CREATE object statement, its attribute value might still be changed; a "CREATE TABLE t LIKE t" can cause some changes in the object's definition. For example, the conditions under which the object is partitioned might have changed since the object was initially created, resulting in more or fewer partitions.

Once the ghost object has been created, TRANSFORM populates the ghost object from data in the original object using the INSERT . . . SELECT statement. Meanwhile users can read and update the original object unless access-options is specified to restrict access to read-only during the TRANSFORM operation. Records are applied to the ghost object without applying triggers, since it is assumed that any triggers were already executed when the record was inserted into the original object. Constraints are not checked at this point, except for uniqueness constraints on changed columns, which are validated as dependent objects are reconstructed.

After the initial copy is created, transaction log records indicating object updates during the operation are also converted to the new definition and applied to the ghost object using the techniques from Tandem U.S. Pat. No. 5,625,815 unless access-options specifies read-only access during the TRANSFORM operation. Once the log information has been applied from the start of the operation to the present, the data in the new object matches the data in the old. TRANSFORM is ready to automatically switch definitions at that point, or can wait for the users to give the operation the go-ahead to complete. In the latter case, new log information is continuously applied as it is generated while waiting for the user to give the go-ahead.

Once the decision to switch to the new object has been made, TRANSFORM needs exclusive access to the original object for a short period of time. An exclusive access lock is acquired on the original object, causing applications to receive a retriable error when trying to access the original object. The retry requests are queued behind the exclusive access lock. The exclusive access lock locks the original object, along with dependent objects.

Once the exclusive access lock is in place TRANSFORM begins the final transaction that covers the entire switch-over. Once TRANSFORM has locked both the table and its dependent objects, it applies any remaining transaction log information generated before exclusive access was acquired. At this point, the ghost objects' contents are guaranteed to be consistent with the original definition and the actual swap commences. At this point, TRANSFORM drops the original object's physical metadata (without removing the database catalog metadata) and gives the ghost object the original object's name. TRANSFORM makes the objects' metadata consistent, keeping dependent object values from the original definitions except where explicitly changed. The exact changes are determined at run-time.

In addition, TRANSFORM must deal with dependent objects. So TRANSFORM loops over the list of dependent objects impacted by the transformation and changes them as needed. This processing occurs in parallel with the processing on the main object and is described further below. Dependent objects are switched in under the same transaction as the primary object. As part of the switch-over, query caches are invalidated, forcing recompilation to re-bind queries to the new object(s). At this point, all final fixup work is done. Then the transaction is committed and the switch to the new object is complete.

FIG. 3 is a flow chart showing the switch step 114 in more detail in an example embodiment of the invention. At step 302 the data and physical-related metadata from the original object is dropped. At step 304 the ghost metadata is adjusted to attach the dependent objects. At step 306 the name of the ghost object is adjusted to match the name of the original object. At step 308 the DDL lock is released.

Once a TRANSFORM operation completes, users pay no additional performance penalty compared to a similar object that is created and populated through the standard interface. It is as if the object always existed in its new definition. There is no run-time translation from different row version formats based on when the row was inserted and how many TRANSFORM operations occurred in the interim.

To meet access demands, data is often replicated in various places like materialized views and presorted and pregrouped in indexes, as well as in other supporting objects. These are collectively called dependent objects, and some might have their own set of dependent objects as well. Dependent object definitions and relationships are stored in metadata, and when an object is reshaped, the metadata describing these relationships must be changed as well.

TRANSFORM automatically adjusts the dependent objects, identifying objects whose data needs reshaping and/or whose metadata must be adjusted to be consistent and compatible with the new definition. An object is said to be metadata-impacted by the proposed transformation if its metadata contains references to the parent object that are affected by the change to that parent object. For example, if a view definition contains a column name whose name changes, the view column name references must be changed in the view definition text stored in the metadata. Making the dependent object's metadata consistent after a TRANSFORM typically requires one transaction with no data movement required. Metadata is not the only dependent object attribute affected by a transformation. An object is said to be physically-impacted by the proposed transformation if it contains records whose contents must be transformed in order to remain logically consistent with the proposed transformation to a parent object. Making a physically-impacted dependent object consistent after a TRANSFORM generally requires making a ghost object with the new definition, and with multiple transactions. Within a single TRANSFORM, any dependent object could be physically-impacted, metadata-impacted, or both, or neither. TRANSFORM constructs three lists of dependent objects. The first is for dependent objects that are neither metadata-impacted nor physically-impacted by the change. The second list is for objects that are metadata-impacted. The third list is for objects that are physically-impacted. Objects can be on both the second and third lists. The lists are populated according to the following rules:

Indexes: If an index definition includes a column that is dropped or whose data type is changed, then the index is physically-impacted by a TRANSFORM command: copies of the data from that column are stored in the index and are not consistent with the redefined object until they have been changed. The index is metadata-impacted as well in this case. Indexes are not physically-impacted by other changes to column definitions, including column name changes, default value changes, or header changes, though the index is metadata-impacted by these changes. Indexes are not impacted in any way when new columns are added to tables unless those columns are also included in the clustering key. If the clustering key is changed, then all indexes are physically-impacted.

Views: If the view definition (either ordinary or materialized, including in cascaded views) includes a column that is dropped, or whose column definition is changed, then the view is metadata-impacted by a TRANSFORM command because it inherits these attributes from the object. For materialized views, the view is physically-impacted too because it contains physical copies of the data in changed columns. Materialized views have associated update log tables; these are impacted along similar rules.

Constraints: If a constraint definition references a column that has been dropped or whose definition (including name) has changed, then the constraint is metadata-impacted. There's also a potential conflict in the constraint definition if the column's data type has been changed to be incompatible with what's specified by the constraint. In addition, the constraint must be reevaluated as part of transforming the data, but that's an impact on the parent object, not the constraint itself. The constraint itself is not physically-impacted by the change.

Triggers: If the trigger definition references a column that has been dropped or whose definition has changed, then the trigger is metadata-impacted by a TRANSFORM command. In this embodiment, triggers don't exist outside of metadata, so they cannot be physically-impacted. No changes are made to existing records due to the trigger's contents (the trigger is not reapplied to the transformed definition). New inserts into the object cause the trigger to act within the boundary of the new definition.

Stored Procedures: Stored Procedures are not affected by Schema Evolution transforms on tables.

Privileges: The ghost object does not have the same privileges attached as the original definition. As part of the switchover, the privileges must be transferred to the new definition.

Materialized views can have dependent objects. The same rules govern dependent object checking for each impacted materialized view in a TRANSFORM command. The only dependent object for an index is a referential integrity constraint, which is removed/recreated if the index is impacted. Otherwise indexes do not have dependent objects. For completeness, the entire dependent objects list is checked and all conflicts noted. The comparison generates the complete list of objects which are physically- and/or metadata-impacted by the proposed transformation, as well as those that are determined to be unaffected by the TRANSFORM. For physically-impacted dependent objects, TRANSFORM automatically creates and populates ghosts in parallel with reshaping the original object and swaps these dependent objects in under the same transaction as it swaps in the new primary object definition. Switchover processing for the primary object includes all dependent objects impacted by the change. For each such dependent object, TRANSFORM drops the original object and renames the ghost object if the object is physically-impacted. It updates the metadata if the object is metadata impacted. When TRANSFORM updates the metadata to redefine the new primary object, it also updates the dependent objects whose metadata is affected by the new definition. Objects that are untouched by the TRANSFORM operation are automatically linked to the new object at this time. When TRANSFORM cannot do so (e.g., an index that only refers to dropped columns or a view whose WHERE clause includes a join that is invalidated by the change), it automatically invalidates or drops the dependent object. When the new definition is switched in, all dependent objects are consistent and complete.

TRANSFORM also supports a facility to exclude rows whose contents are incompatible with the new definition of the object. This facility is intended for cases where there might be a small number of records whose contents are incompatible with the new definition (say, because they contain invalid dates or numbers that are bigger than a redefined container can hold), not for cases where most records do not match the definition. These records are not inserted into the new object, but are placed in a special table for the user to resolve manually. These records are also deleted from dependent objects that contain copies of them, even if those dependent objects weren't otherwise impacted by the TRANSFORM. If the user corrects the incompatible data and reinserts the record manually, the dependent objects will be updated according to the current Database subsystem rules.

What is claimed is:

1. In a computing system having a memory storing an original data object, a method for changing the original data object into a new data object using a single command, the steps of the method comprising:
   validating the single command;
   creating a ghost data object based on a new data object schema definition indicated by the single command;
   populating the ghost data object with data from the original data object;
   applying transaction log records from the original data object to the ghost data object;
   exclusively locking the original data object;
   applying final transaction log records from the original data object to the ghost data object; and switching the ghost data object to become the new data object.

2. The method of claim 1, wherein validating the command comprises:
   obtaining a data definition lock for the original object;
   generating a complete mapping specification (INSERT . . . SELECT) with a populated list of changes made to the original data object when the complete mapping specification is not included as a parameter of the single command;
   validating the list of changes by class.

3. The method of claim 1, wherein switching the ghost data object to become the new data object comprises:
   dropping the original object;
   giving the ghost data object a name of the original data object;
   releasing all locks on the original data object.

4. The method of claim 1, wherein data in the original data object can be accessed for both read and write operation until the original data object is exclusively locked to switch in the new definition.

5. The method of claim 1, wherein a column data size in the new data object is smaller than a corresponding column data size in the original data object.

6. The method of claim 1, wherein a column data type in the new data object is incompatible to a corresponding column data type in the original data object.

7. The method of claim 1, wherein the syntax of the single command completely defines the new data object.

8. The method of claim 7, wherein a CREATE TABLE statement is used to completely define the new data object.

9. The method of claim 1, wherein the syntax of the single command defines one or more differences between the new data object and the original data object.

10. The method of claim 1, wherein a user specified mapping is used to convert a plurality of data types in the original data object to the corresponding plurality of data types in the new data object.

11. The method of claim 1, wherein a user specified mapping is used to convert a plurality of data values in the original data object to the corresponding plurality of data values in the new data object.

12. The method of claim 1, wherein dependent objects of the original data object are automatically modified to match the new data object.

13. The method of claim 1, wherein records in the original data object, that are not compatible to their corresponding records in the new data object, are placed into an exception table.

14. A computer software product that includes a non-transitory medium readable by a processor, the non-transitory medium having stored thereon code that when executed performs a method for modifying an original data object using a single command, the method comprising:
   validating the single command configured to change an original data object into a new data object;
   creating a ghost data object based on a new data object schema definition indicated by the single command;
   populating the ghost data object with data from the original data object;
   applying transaction log records from the original data object to the ghost data object;
   exclusively locking the original data object;
   applying final transaction log records from the original data object to the ghost data object; and
   switching the ghost data object to become the new data object.

15. The method of claim 14, wherein validating the command comprises:
   obtaining a data definition lock for the original object;
   generating a complete mapping specification (INSERT . . . SELECT) with a populated list of changes made to the original data object when the complete mapping specification is not included as a parameter of the single command;
   validating the list of changes by class.

16. The method of claim 14, wherein switching the ghost data object to become the new data object comprises:
   dropping the original object;
   giving the ghost data object a name of the original data object;
   releasing all locks on the original data object.

17. The method of claim 14, wherein data in the original object can be accessed for both read and write operation until the original data object is exclusively locked to switch in the new definition.

18. The method of claim 14, wherein a column data size in the new data object is smaller than a corresponding column data size in the original data object.

19. The method of claim 14, wherein a column data type in the new object is incompatible to a corresponding column data type in the original data object.

20. The method of claim 14, wherein the syntax of the single command completely defines the new data object.

21. The method of claim 20, wherein a CREATE TABLE statement is used to completely define the new data object.

22. The method of claim 14, wherein the syntax of the single command defines one or more differences between the new data object and the original data object.

23. The method of claim 14, wherein a user specified mapping is used to convert a plurality of data types in the original data object to the corresponding plurality of data types in the new data object.

24. The method of claim 14, wherein dependent objects of the original data object are automatically modified to match the new data object.

25. A computing system having a memory storing an original data object, the computer system comprising:
   at least one processor configured to process a single command that changes the original data object into a new data object by:
   validating the single command;
   creating a ghost data object based on a new data object schema definition indicated by the single command;
   populating the ghost data object with data from the original data object;
   applying transaction log records from the original data object to the ghost data object;
   exclusively locking the original data object;
   applying final transaction log records from the original data object to the ghost data object; and
   switching the ghost data object to become the new data object.

* * * * *